(12) United States Patent
Kitto et al.

(10) Patent No.: US 10,818,403 B2
(45) Date of Patent: Oct. 27, 2020

(54) INTER-MODULE FUEL SHUFFLING

(71) Applicant: NuScale Power, LLC, Corvallis, OR (US)

(72) Inventors: Allyson Kitto, Corvallis, OR (US); Daniel Ingersoll, Oak Ridge, TN (US); Jose N. Reyes, Jr., Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 556 days.

(21) Appl. No.: 15/445,186

(22) Filed: Feb. 28, 2017

(65) Prior Publication Data

US 2017/0301422 A1  Oct. 19, 2017

Related U.S. Application Data

(60) Provisional application No. 62/314,523, filed on Mar. 29, 2016.

(51) Int. Cl.
*G21C 19/20* (2006.01)
*G21D 1/00* (2006.01)
(Continued)

(52) U.S. Cl.
CPC .............. *G21C 19/205* (2013.01); *G21C 5/18* (2013.01); *G21C 19/07* (2013.01); *G21D 1/00* (2013.01); *Y02E 30/40* (2013.01)

(58) Field of Classification Search
CPC ........ G21C 19/205; G21C 19/07; G21C 5/18; G21C 19/00; G21D 1/00
(Continued)

(56) References Cited

U.S. PATENT DOCUMENTS 4,451,427 A * 5/1984 Ross .................... G21C 19/205
376/267
5,677,938 A * 10/1997 Gassmann ............... G21C 7/02
376/267
(Continued)

FOREIGN PATENT DOCUMENTS

| CN | 101447238 A | 6/2009 |
| WO | 2008/077297 | 8/2008 |
| WO | 2015/099877 | 7/2015 |

OTHER PUBLICATIONS

Fedosov, "Optimal fuel utilization during decommissioning of nuclear power plants with RBMK reactors", Atomic energy 102, No. 5 (2007): 353-360. (Year: 2007).*
(Continued)

*Primary Examiner* — Jack W Keith
*Assistant Examiner* — Daniel Wasil
(74) *Attorney, Agent, or Firm* — Perkins Coie LLP

(57) ABSTRACT

A method of loading fuel in multiple reactor cores associated with a plurality of fuel cycles. The method includes, in a first fuel cycle, loading a first reactor core with a first fuel assembly selected from a first batch of fuel, loading the first reactor core with a first partially spent fuel assembly from a second batch of fuel, loading a second reactor core with a second fuel assembly from the first batch of fuel, and loading the second reactor core with a second partially spent fuel assembly from the second batch of fuel. In a second fuel cycle, which is performed after a completion of the first fuel cycle, the method includes loading the second reactor core with a fresh fuel assembly, and loading the second reactor core with the first fuel assembly from the first batch of fuel.

10 Claims, 10 Drawing Sheets

(51) Int. Cl.
*G21C 5/18* (2006.01)
*G21C 19/07* (2006.01)

(58) Field of Classification Search
USPC .......................................................... 376/267
See application file for complete search history.

(56) References Cited

U.S. PATENT DOCUMENTS

| | | |
|---|---|---|
| 9,236,150 B2 | 1/2016 | Ahlfeld et al. |
| 9,293,228 B2 | 3/2016 | Stucker et al. |
| 2007/0195919 A1* | 8/2007 | Bouffier ................. G21C 3/326 376/435 |
| 2012/0069948 A1 | 3/2012 | Ma |
| 2014/0133619 A1 | 5/2014 | Bilovsky |

OTHER PUBLICATIONS

Nissan, "Refueling in nuclear engineering: The Fuelcon project", Computers in Industry 37, No. 1 (1998): 43-54. (Year: 1998).*
International Preliminary Report on Patentability; International Application No. PCT/US2017/020169 dated Oct. 11, 2018.
International Search Report and Written Opinion for International Application No. PCT/US2017/020169 dated Sep. 14, 2017.

* cited by examiner

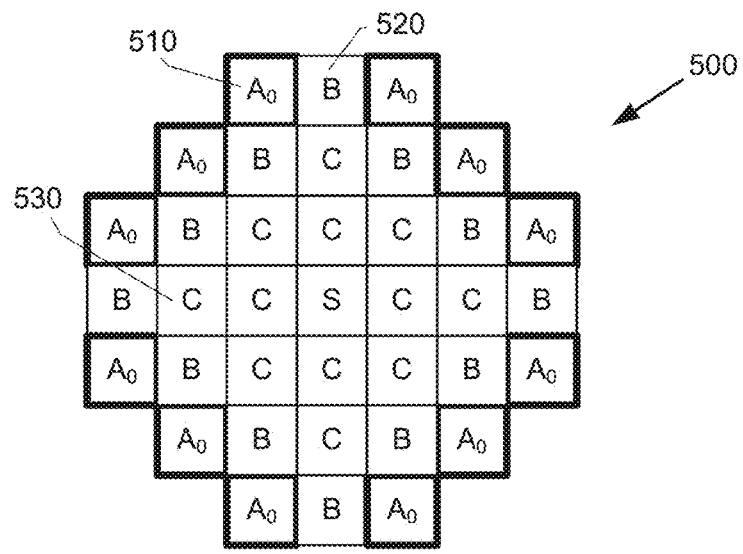
FIG. 5A
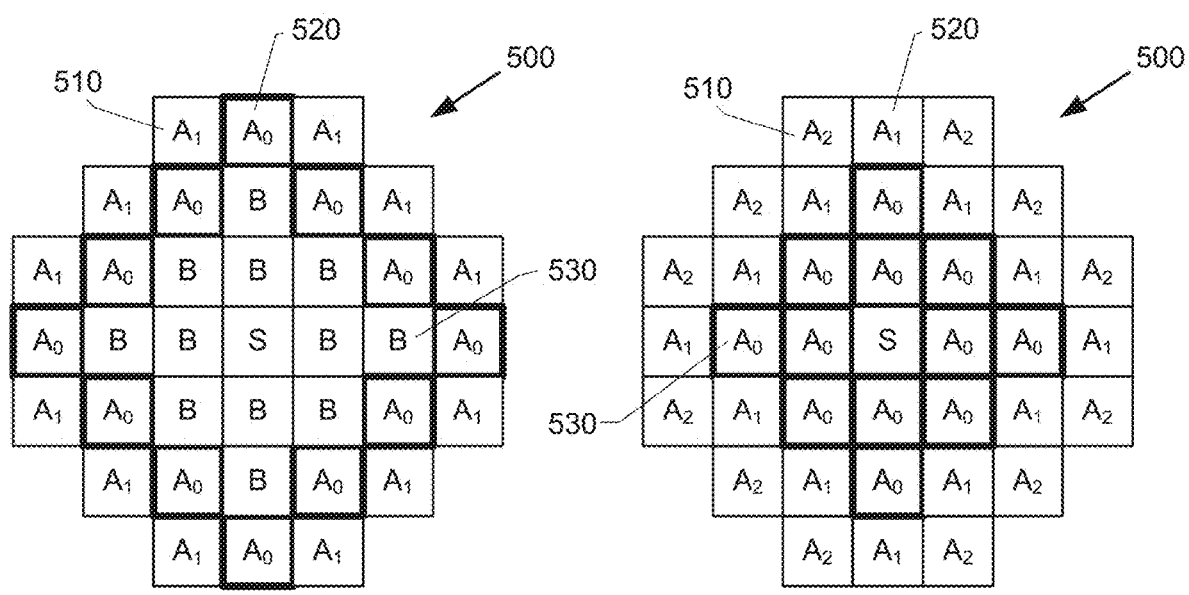
FIG. 5B
FIG. 5C

INTER-MODULE FUEL SHUFFLING

STATEMENT OF RELATED MATTERS

This application claims priority to U.S. Provisional Application No. 62/314,523 filed on Mar. 29, 2016 and entitled Inter-Module Shuffling for Fuel Cycle Optimization, the contents of which are herein incorporated by reference in their entirety.

GOVERNMENT INTEREST

This invention was made with Government support under Contract No. DE-NE0000633 awarded by the Department of Energy. The Government has certain rights in this invention.

BACKGROUND

While fuel costs for some types of nuclear power plants may be lower and more stable than for a comparably sized fossil fueled plant, the fuel cost for a nuclear plant may still represent several million dollars per year. In order to optimize overall plant operations, only a small percentage of the actual fissile isotope in nuclear fuel is typically consumed before the fuel is discharged from the reactor into a spent fuel pool.

In known pressurized water reactors (PWR) and boiling water reactors (BWR), a reactor core may contain a large number of fuel rods that may be arranged as a plurality of fuel assemblies. Some improvement in fuel burnup may be achieved by shuffling burned fuel assemblies within a large reactor core, which may contain over two hundred fuel assemblies; however, core physics considerations significantly limit the potential gain in fuel consumption and commensurate reduction in fuel costs.

During refueling operations, in which some or all of the fuel rods in the reactor core may be replaced, the reactor vessel must be at least partially disassembled in order to gain access to the reactor core. The reactor therefore must be shut-down during the refueling operation, at which time a typical power plant is no longer able to generate electricity.

This application addresses these and other problems.

SUMMARY

Example methods of loading fuel in multiple reactor cores associated with a plurality of fuel cycles are disclosed herein. An example method may comprise, in a first fuel cycle, loading a first reactor core with a first fuel assembly selected from a first batch of fuel, loading the first reactor core with a first partially spent fuel assembly from a second batch of fuel, loading a second reactor core with a second fuel assembly from the first batch of fuel, and loading the second reactor core with a second partially spent fuel assembly from the second batch of fuel. In a second fuel cycle, which may be performed after a completion of the first fuel cycle, the method may comprise loading the second reactor core with a fresh fuel assembly, and loading the second reactor core with the first fuel assembly from the first batch of fuel.

Example fuel loading systems are disclosed herein. An example fuel loading system may comprise a fuel storage facility configured to store a number of fuel assemblies associated with a plurality of on-site reactor cores, and a transport apparatus configured to transport spent fuel assemblies to the fuel storage facility. A first reactor core may comprise a first fuel loading configuration including a first fuel assembly associated with a first batch of fuel and a first partial spent fuel assembly associated with a second batch of fuel.

A second reactor core may comprise a second fuel loading configuration including a second fuel assembly associated with the first batch of fuel, a second partial spent fuel assembly associated with the second batch of fuel, and a third-cycle fuel assembly including partially spent nuclear fuel that has previously completed two fuel cycles. The second partial spent fuel assembly may be removed from the first reactor core and transported to the fuel storage facility following a prior fuel cycle.

Additionally, a third reactor core may comprise a third fuel loading configuration including a third fuel assembly associated with the first batch of fuel and a third partial spent fuel assembly that replaced the third-cycle fuel assembly in the third reactor core. The third-cycle fuel assembly may be removed from the third reactor core and transported to the fuel storage facility following the prior fuel cycle.

Example memory devices are disclosed herein. An example memory device may have instructions stored thereon that, in response to execution by a processing device, cause the processing device to perform operations. The operations may comprise determining, for a first fuel cycle, a first fuel configuration associated with a first reactor core. The first fuel configuration may comprise a first fuel assembly selected from a first batch of fuel and a first partially spent fuel assembly selected from a second batch of fuel. The operations may also comprise determining, for the first fuel cycle, a second fuel configuration associated with a second reactor core.

The second fuel configuration may comprise a second fuel assembly selected from the first batch of fuel, and a second partially spent fuel assembly selected from the second batch of fuel. Additionally, the operations may comprise updating, for a second fuel cycle to be implemented after a completion of the first fuel cycle, the second fuel configuration associated with the second reactor core to include a fresh fuel assembly and the first fuel assembly selected from the first batch of fuel.

BRIEF DESCRIPTION OF DRAWINGS

FIG. 5A illustrates a plan view of an example array of fuel assemblies associated with a first fuel cycle.

FIG. 5B illustrates a plan view of an example array of fuel assemblies associated with a second fuel cycle.

FIG. 5C illustrates a plan view of an example array of fuel assemblies associated with a third fuel cycle.

DETAILED DESCRIPTION

Various examples disclosed and/or referred to herein may be operated consistent with, or in conjunction with, one or more features found in U.S. patent application Ser. No. 15/004,128 filed on Jan. 22, 2016 and entitled In-Core Instrumentation, the contents of which are herein incorporated by reference in their entirety.

Figure 1:
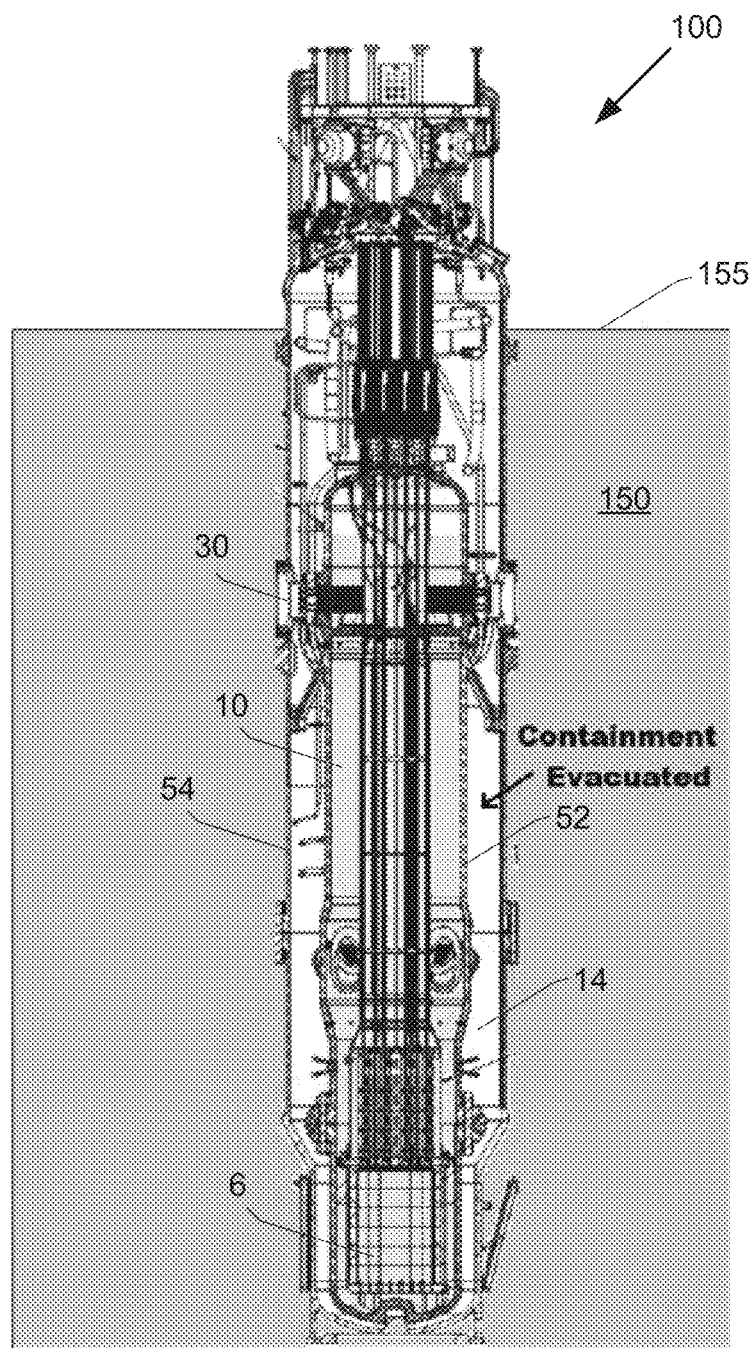
FIG. 1 illustrates an example nuclear reactor module.

FIG. 1 illustrates an example nuclear reactor module 100 with a dry and/or evacuated containment region 14. The nuclear reactor module 100 may comprise a reactor core 6 surrounded by a reactor pressure vessel 52. Primary coolant 10 in the reactor pressure vessel 52 surrounds the reactor core 6.

Reactor pressure vessel 52 may be surrounded by a containment vessel 54. In some examples, containment vessel 54 may be located in a reactor pool 150. The reactor pool 150 may contain borated water stored below ground level. Containment vessel 54 may be at least partially submerged in the reactor pool 150. In some examples, at least a portion of the upper head of containment vessel 54 may be located above a surface 155 of the reactor pool 150 in order to keep any electrical connections and/or penetrations through the upper head dry. Additionally, containment vessel 54 may be configured to prohibit the release of any primary coolant 10 associated with reactor pressure vessel 52 to escape outside of containment vessel 54 into the reactor pool 150 and/or into the surrounding environment.

Containment vessel 54 may be approximately cylindrical in shape. In some examples, containment vessel 54 may have one or more ellipsoidal, domed, or spherical ends, forming a capsule shaped containment. Containment vessel 54 may be welded or otherwise sealed to the environment, such that liquids and/or gases are not allowed to escape from, or enter into, containment vessel 54 during normal operation of reactor module 100. In various examples, reactor pressure vessel 52 and/or containment vessel 54 may be bottom supported, top supported, supported about its center, or any combination thereof.

In some examples and/or modes of operation, an inner surface of reactor pressure vessel 52 may be exposed to a wet environment comprising the primary coolant 10 and/or vapor, and an outer surface of reactor pressure vessel 52 may be exposed to a substantially dry environment. The reactor pressure vessel 52 may comprise and/or be made of stainless steel, carbon steel, other types of materials or composites, or any combination thereof.

The containment region formed within containment vessel 54 may substantially surround the reactor pressure vessel 52, Containment region 14 may comprise a dry, voided, evacuated, and/or gaseous environment in some examples and/or modes of operation. Containment region 14 may comprise an amount of air, a Noble gas such as Argon, other types of gases, or any combination thereof. Additionally, the surfaces of one or both of reactor pressure vessel 52 and containment vessel 54 that bound containment region 14 may be exposed to water during certain modes of operation such as refueling, shutdown, or transport within the reactor pool 150.

Containment region 14 may be maintained at or below atmospheric pressure, including a partial vacuum of approximately 300 mmHG absolute (5.8 psia) or less. In some examples, containment region 14 may be maintained at approximately 50 mmHG absolute (1 psia). In still other examples, containment region 14 may be maintained at a substantially complete vacuum. Any gas or gasses in containment vessel 54 may be evacuated and/or removed prior to operation of reactor module 100. During normal operation of reactor module 100, containment region 14 may be kept dry and/or evacuated of any water or liquid. Similarly, containment region 14 may be kept at least partially evacuated of any air or gases.

A heat exchanger may be configured to circulate feedwater and/or steam in a secondary cooling system in order to generate electricity. In some examples, the feedwater passes through the heat exchanger and may become super-heated steam. The feedwater and/or steam in the secondary cooling system are kept isolated from the primary coolant 10 in the reactor pressure vessel 52, such that they are not allowed to mix or come into direct fluid) contact with each other.

The heat exchanger and/or associated piping of the secondary cooling system may be configured to penetrate through reactor pressure vessel 52 at one or more plenum 30. Additionally, the secondary piping may be routed to the upper region of containment above the level of the reactor pool 150, where the piping penetrates through containment vessel 54. By exiting containment above the reactor pool 150, the high temperature steam and feedwater lines do not lose heat to the reactor pool water 150.

During a normal, non-emergency shutdown, one or more steam generators may be configured to release steam and cool down the reactor module 100 from normal operating temperatures down to about 250° F. (121° C.). However, as the process of releasing steam may become somewhat ineffective at 250° F., the temperature of the reactor module may become essentially static or fixed the closer that it gets to the boiling temperature of the secondary coolant.

The cool-down process may be augmented by at least partially flooding the containment region 14 of the example reactor module 100. In some examples, the containment region 14 may be flooded with borated water from the reactor pool 150 until the level of the water is at or above the height of a pressurizer baffle plate located within the reactor pressure vessel 52. Diming the cool-down process, water that enters containment region 14 is kept outside of reactor pressure vessel 52 and, similarly, all of the primary coolant 10 is kept within reactor pressure vessel 52.

The upper head of the reactor pressure vessel 52 may be kept above the level of the water to avoid any connections that may pass through the upper head from being submerged in or otherwise exposed to water. In some examples, the predetermined level of the water within the containment region 14 may be associated with flooding the containment region 14 so that the majority of the reactor pressure vessel 52 is surrounded by the water. In other examples, the entire reactor pressure vessel 52 may be surrounded or submerged in the water that floods the containment region 14.

The containment region 14 may be at least partially filled with water to initiate a passive cool-down process to a cold shutdown state, e.g., a shutdown state associated with primary coolant temperatures of less than 200° F. (93° C.). Once the containment region 14 is flooded above a predetermined level, no further action may be required, and the passive cool-down of the operating temperature to less than 200° F. may occur primarily as a function of natural circulation of the primary coolant 10 within the reactor pressure vessel 52, the shutdown reactor's decay heat, the transfer of heat from the primary coolant 10 to the water in the containment region 14, and the temperature of the reactor pool 150.

Figure 2:
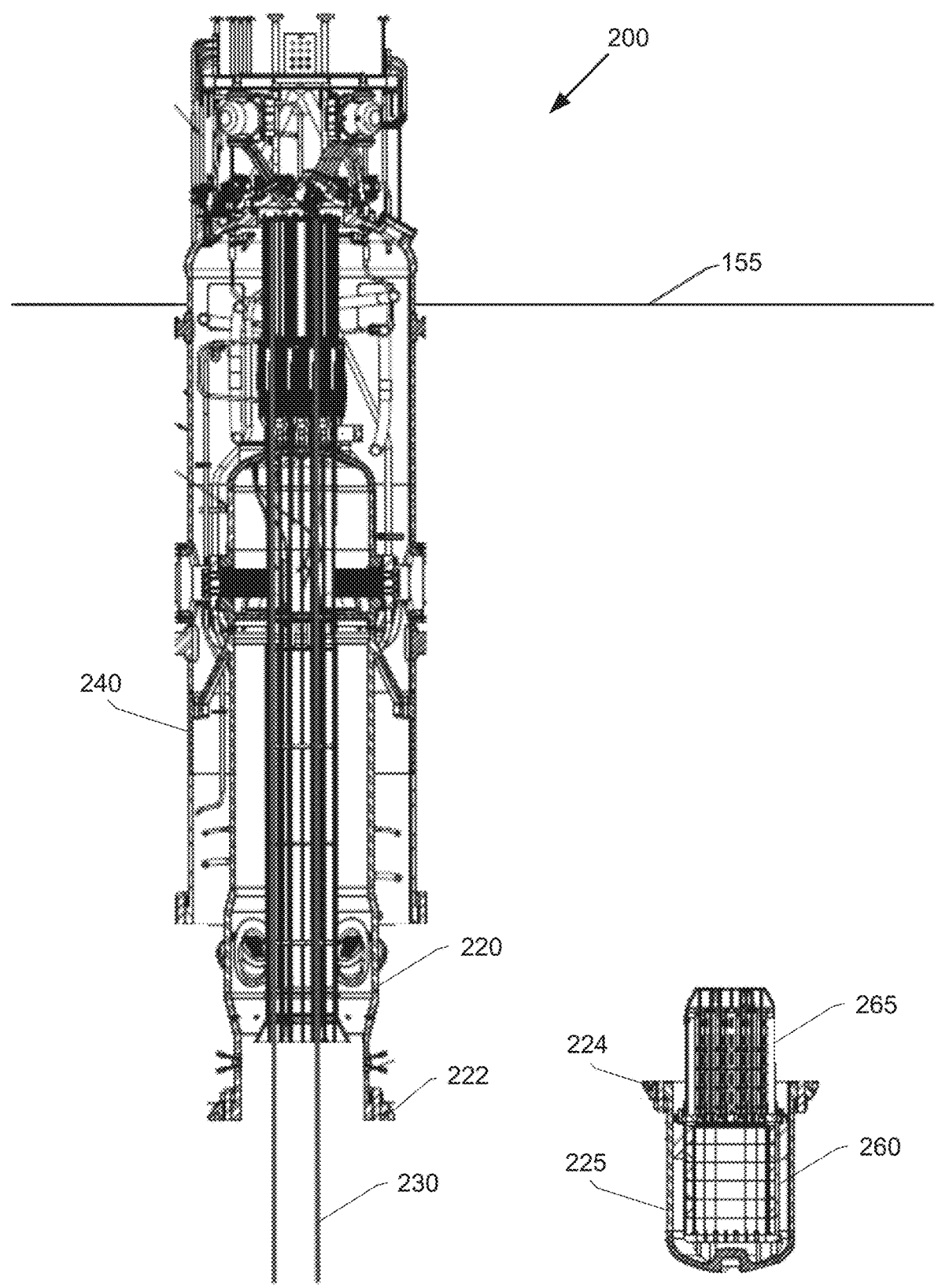
FIG. 2 illustrates an example nuclear reactor module comprising a partially disassembled reactor pressure vessel.

FIG. 2 illustrates an example nuclear reactor module 200 comprising a reactor pressure vessel 220 housed within a partially disassembled containment vessel 240. In-core instrumentation 230 may be removed from a reactor core 260 contained within reactor pressure vessel 220. In some examples, in-core instrumentation 230 may comprise twelve or more in-core instrument assemblies. Each in-core assembly may comprise a monitor, a sensor, a measuring device, a detector, other types of instruments, or any combination thereof.

A lower vessel head 225 is shown having been removed from the reactor pressure vessel 220, such as during refueling, maintenance, inspection, or other non-operational processes of reactor module 200. Lower vessel head 225 may remain completely submerged below the surface 155 of a reactor pool, such as reactor pool 150 (FIG. 1) during the disassembly of containment vessel 240. While reactor pressure vessel 220 may remain intact and/or sealed during the disassembly of containment vessel 240, at least the lower portion of reactor pressure vessel 220 may also be surrounded by the reactor pool.

Reactor pressure vessel 220 may be removably attached to lower vessel head 225 via an upper vessel flange 222 and a lower vessel flange 224. For example, a plurality of bolts may pass through and/or connect upper vessel flange 222 to lower vessel flange 224, The bolts may be loosened and/or removed prior to removing lower vessel head 225 from reactor pressure vessel 220. In some examples, containment vessel 240 may be similarly disassembled, prior to removing lower vessel head 225.

As a result of removing lower vessel head 225 from reactor pressure vessel 220, the in-core instrumentation 230 may be effectively withdrawn from the reactor core 260 as the lower vessel head 225 is being separated. During a non-operational process, such as refueling, a visual inspection of the exterior of the reactor pressure vessel 220 and containment vessel 240 may be performed. Following the removal of lower vessel head 225, remote inspection of the flanges and internal surfaces of the vessels may be performed while the vessels and/or lower heads are supported in one or more stands. In some examples, the remote inspections may comprise ultrasonic testing of key welds and full visual inspection of the internal surfaces. Additionally, some or all of the inspection may occur underneath the surface 155 of a reactor pool.

The withdrawal of in-core instrumentation 230 from the reactor core 260 and guide tubes may be accomplished without breaking the water-tight seal formed between containment vessel 240 and the surrounding pool of water. For example, the upper head of containment vessel 240 located at least partially above the surface 155 of the reactor pool may remain completely sealed to the surrounding environment during the disassembly of both the reactor pressure vessel 220 and the containment vessel 240. Additionally, the lower vessel head 225 may be moved to a refueling bay, or remain behind without being moved, such that multiple operations may be performed on separated components of reactor module 200.

During disassembly and transport of reactor module 200 and/or containment vessel 240, the lower ends of in-core instrumentation 230 may remain submerged in and surrounded by the reactor pool water at all times. The reactor pool water may operate to both reduce the temperature of in-core instrumentation 230 and provide a shield for any radiation which may be emitted from the lower ends.

Figure 3:
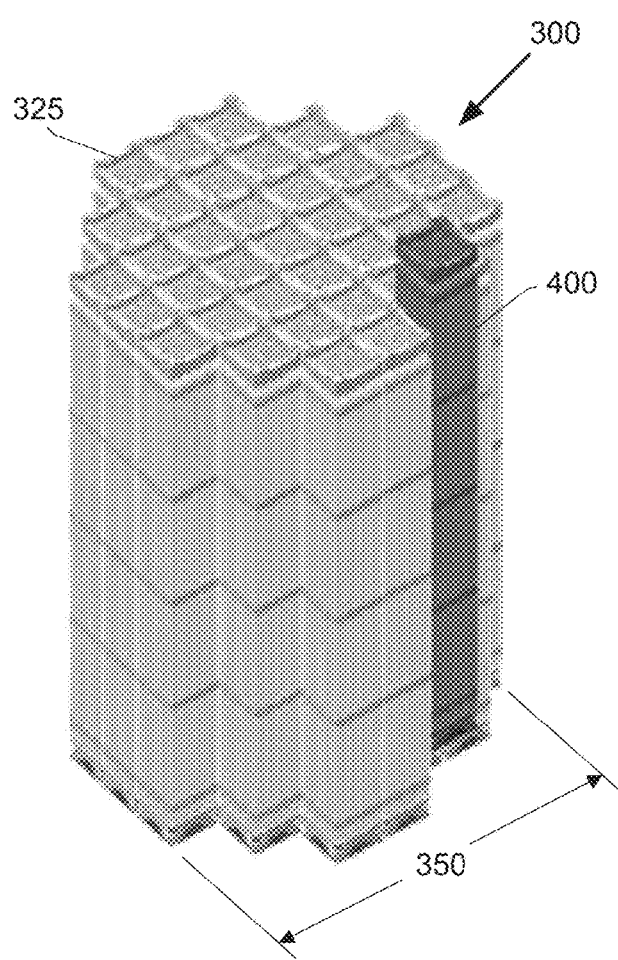
FIG. 3 illustrates an example reactor core.

FIG. 3 illustrates an example reactor core 300, which may be configured similarly to reactor core 260 of FIG. 2. Reactor core 300 may comprise an array of fuel assemblies 325 which may be arranged in a generally symmetrical pattern. The array of fuel assemblies 325 may comprise a plurality of fuel assemblies, such as fuel assembly 400 shown partially removed from the reactor core 300, as well as one or more neutron sources. The number of fuel assemblies included in the reactor core may vary from one reactor to another depending, at least in part, on the total amount of power that the reactor may be configured to generate. In the example reactor core 300 there is illustrated a total of thirty seven fuel assemblies, although more or fewer fuel assemblies per reactor core are contemplated herein.

Some or all of the fuel assemblies may be removed from, added to, and/or replaced in reactor core 300 during one or more processes, such as an inspection process or a refueling process. Additionally, in some examples, the various fuel assemblies may be interchangeably located or placed within the reactor core 300, such that fuel assembly 400 may be moved from one position in the array 325 to another position in the array during one or more fuel cycles.

The width 350 of the reactor core 300 may vary according to the number and/or size of the fuel assemblies. The width 350 may be approximately 1.5 meters by way of illustrative example only, and other widths associated with reactor core 300 are contemplated herein.

Figure 4:
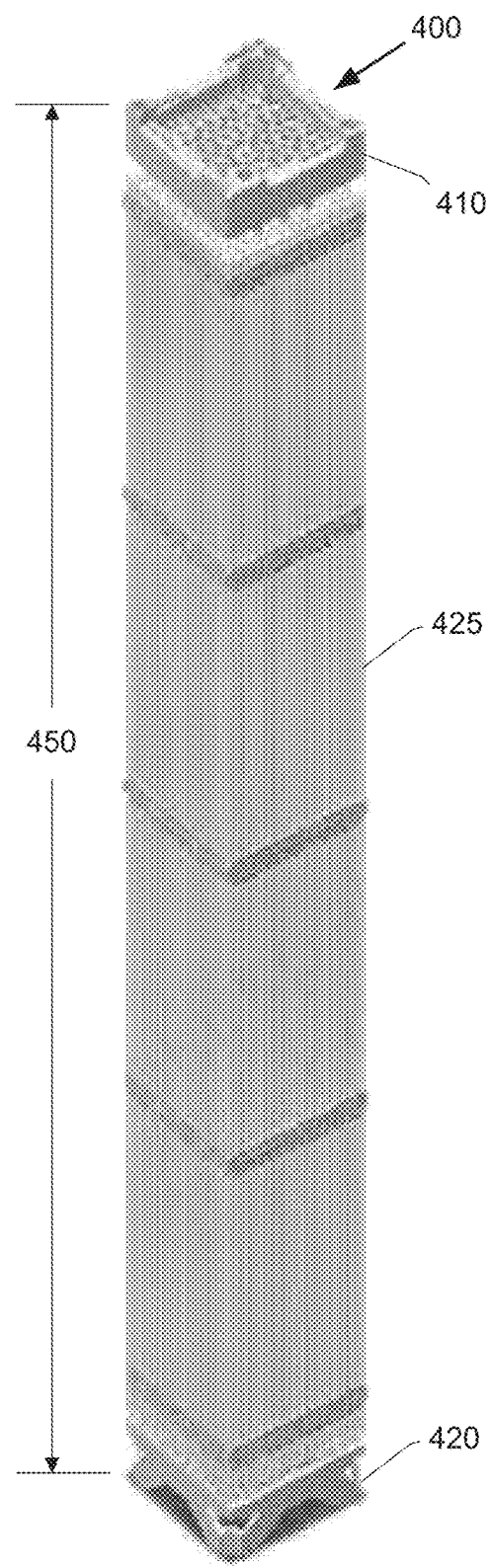
FIG. 4 illustrates an enlarged view of an example fuel assembly.

FIG. 4 illustrates an enlarged view of the example fuel assembly 400 shown in isolation from the reactor core. Fuel assembly 400 may comprise a plurality of fuel rods 425. Fuel assembly 400 may comprise over one hundred fuel rods in some examples. The fuel rods 425 may be supported within fuel assembly 400 by an upper mounting structure 410 and a lower mounting structure 420. Additionally, fuel assembly 400 may comprise a number of guide tubes (visible from above the upper mounting structure 410) into which one or more control rods may be inserted during operation of the reactor.

Fuel rods 425 may comprise a radioactive material such as uranium-oxide (UO2) fuel, mixed uranium-plutonium oxide (MOX) fuel, other types of nuclear fuel, or any combination thereof. The overall reactivity level of the fuel assembly 400 may decrease as the effective concentration of uranium or other radioactive material is consumed or depleted through usage and/or time. In some examples, the fuel assembly 400 may be transferred and/or stored as a unitary structure before, during, or after being used in a reactor, and without removing the control rods 425 once they have been installed. In other examples, individual control rods may be removed for reprocessing or disposition once the useful life of the fuel assembly 400 is complete.

The height 450 of the fuel assembly 400 may vary according to the size of the fuel rods 425. The height 450 may be approximately 2.5 meters by way of illustrative example only, and other heights associated with fuel assembly 400 are contemplated herein.

FIG. 5A illustrates a plan view of an example array of fuel assemblies 500 associated with a first fuel cycle. The array of fuel assemblies 500 may be logically divided into a number of sections, and in some examples there may be three sections. The number of sections may correspond with a number of expected fuel cycles, and in some examples the sections may be oriented in approximately concentric arrangements in the fuel array 500.

A first section 510 of the fuel array 500 may comprise a number of fuel assemblies indicated as "A1" and in some examples the A0 fuel assemblies may represent new or fresh fuel which has not yet been consumed in a reactor. The first section 510 may be approximately located in an outer concentric region of the fuel array 500. The location of the example first section 510 is emphasized in FIG. 5A for purposes of clarity.

A second section 520 of the fuel array 500 may comprise a number of fuel assemblies indicated as "B" and in some examples the B fuel assemblies may represent fuel which has been partially consumed in a reactor. The second section 520 may be approximately located within the interior of the concentric region associated with the first section 510. The location of the example second section 520 is emphasized in FIG. 5B for purposes of clarity.

A third section 530 of the fuel array 500 may comprise a number of fuel assemblies indicated as "C" and in some examples the C fuel assemblies may represent fuel which has been partially consumed in a reactor. The third section 530 may be approximately located within the interior of the concentric region associated with the second section 520 or, in some examples, predominately located in a central region of the array 500. The location of the example third section 530 is emphasized in FIG. 5C for purposes of clarity.

The radioactivity or reactivity associated with each section may vary. For example, the B fuel assemblies associated with the second section 520 may be more reactive than the C fuel assemblies associated with the third section 530, and the B fuel assemblies may be less reactive than the A0 fuel assemblies associated with the second section 520. Additional sections and/or numbers of concentric regions of fuel may be provided in other example fuel assembly arrays according to the size of the reactor core and/or the number of fuel cycles associated with the fuel.

In some examples, the number of A0 fuel assemblies in first section 510 may equal the number of B fuel assemblies in second section 520, and similarly the number of B fuel assemblies in second section 520 may equal the number of C fuel assemblies in third section 530.

A neutron source may be located at the center "S" of the fuel array 500. In other examples, a fuel assembly may be located at the center S of the array 500 which may or may not be shuffled with the other sections. In still other examples, the center S may be left open to provide a through-path or channel for coolant and/or to house a medium that promotes the thermalization of fast neutrons so as to increase neutron absorption in the surrounding fuel assemblies.

FIG. 5B illustrates a plan view of the example array of fuel assemblies 500 associated with a second fuel cycle, in which some or all of the fuel assemblies may be shuffled. The A0 fuel assemblies which were located at first section 510 in FIG. 5A may be moved to the second section 520, and similarly the B fuel assemblies which were located at second section 520 in FIG. 5A may be moved to the third section 530. In some examples, first section 510 of the fuel array 500 may comprise a number of fuel assemblies indicated as "A1" and representing a new or fresh batch of fuel which has not yet been consumed in the reactor core prior to the second fuel cycle.

FIG. 5C illustrates a plan view of the example array of fuel assemblies 500 associated with a third fuel cycle, in which some or all of the fuel assemblies may again be shuffled. The A1 fuel assemblies which were located at first section 510 in FIG. 5B may be moved to the second section 520, and similarly the A0 fuel assemblies which were located at second section 520 in FIG. 5B may be moved to the third section 530. In some examples, first section 510 of the fuel array 500 may comprise a number of fuel assemblies indicated as "A2" and representing a new or fresh batch of fuel which has not yet been consumed in the reactor prior to the third fuel cycle.

The fuel assemblies associated with each section may be associated with a different amount of remaining useful life or number of fuel cycles. For example, the A0 fuel assemblies located in the third section 530 may have previously gone through two fuel cycles prior to the third fuel cycle, as may be readily understood with reference to the emphasized sections illustrated by the progression of FIGS. 5A to 5C. On the other hand, the A1 fuel assemblies located in the second section 520 may have previously gone through only one fuel cycle prior to the third fuel cycle.

For a fuel array 500 which is associated with a three cycle refueling process or fuel shuffling, the A1 fuel assemblies may have one remaining fuel cycle, e.g., the third fuel cycle, before their useful life is completed, whereas the new A2 fuel assemblies may still have three remaining fuel cycles of useful life, including the third fuel cycle. In some examples, each fuel assembly may be shuffled between the different sections of the fuel array throughout their useful life.

Whereas the direction of fuel shuffling indicated in FIGS. 5A-5C is illustrated as occurring from the outer fuel assembly locations, or first section 510, of the fuel array 500 towards the third section 530 or center S, in other examples the direction of fuel shuffling may be directed in an opposite sense, from the third section 530 or center S towards the outer fuel assembly locations of the fuel array 500. In still other examples, fuel shuffling may be accomplished in other geometric patterns, or combinations of directions, to provide alternative reactivity profiles.

Figure 6:
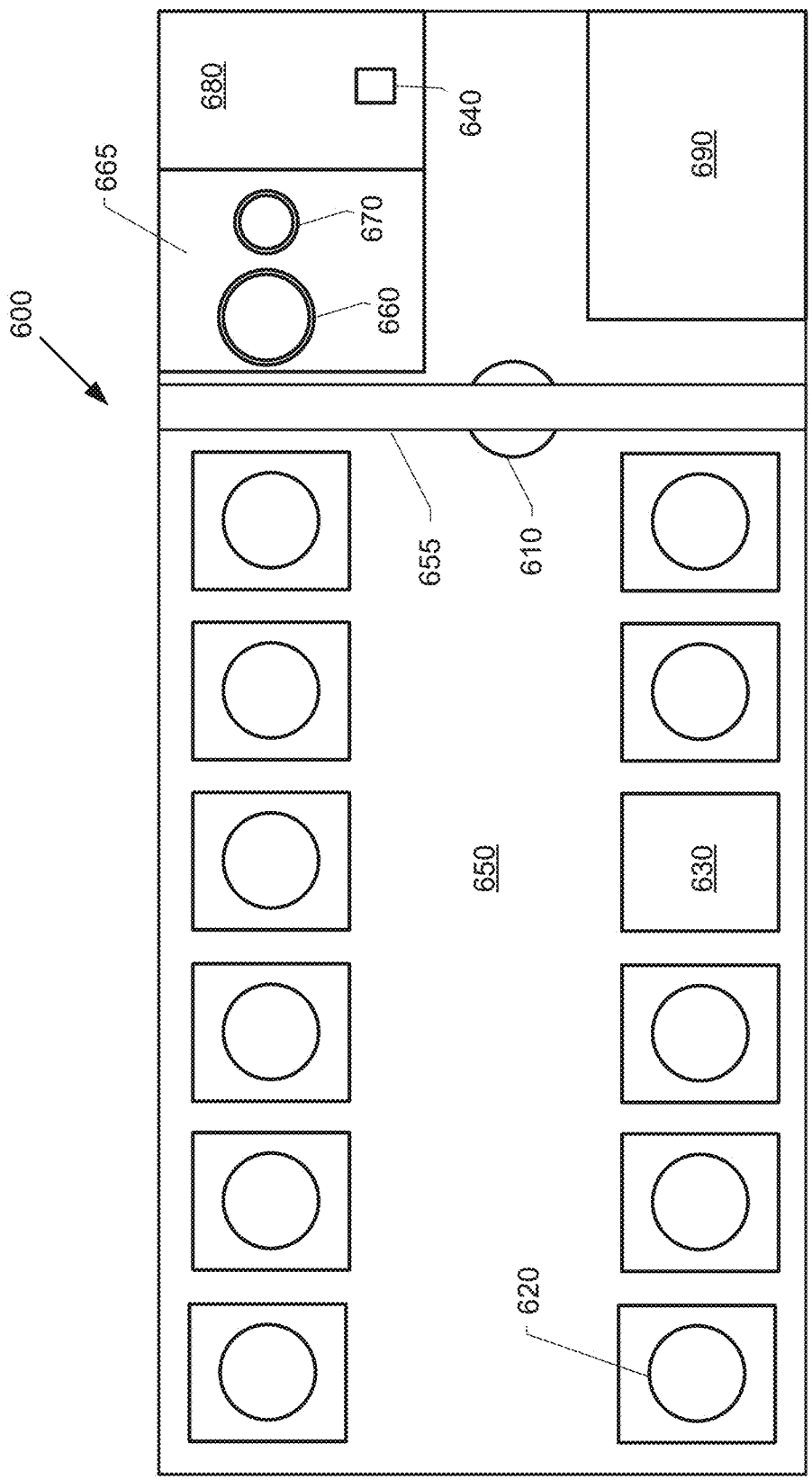
FIG. 6 illustrates a nuclear power facility comprising a plurality of reactor modules.

FIG. 6 illustrates a nuclear power building 600 comprising a plurality of reactor modules, such as a reactor module 610 and an additional reactor module 620. Nuclear power building 600 is shown as including twelve reactor modules by way of example only, and fewer or more reactor modules per nuclear power building are contemplated herein.

Nuclear power building 600 may comprise an overhead crane 655 configured to move or transport the plurality of reactor modules. In the illustrated example, reactor module 610 has been removed from a reactor bay 630 and is in the process of being transported through a shared reactor building passageway 650. The passageway 650 may be fluidly connected to each of the reactor bays, such as reactor bay 630, allowing reactor module 610 to be transported by crane 655 while being at least partially submerged under water.

Passageway 650 may fluidly connect reactor bay 630 to a spent fuel pool 680 and/or to a dry dock 690. Additionally, the passageway 650 may fluidly connect reactor bay 630 to a refueling bay 665 containing a containment vessel stand 660 and a reactor pressure vessel stand 670.

Containment vessel stand 660 may be configured to assemble and/or disassemble a containment vessel, such as containment vessel 240 (FIG. 2), after the reactor module has been shut down. During disassembly of the reactor module, the lower containment head of the containment vessel may be placed in containment vessel stand 660. For example, a crane may be configured to transport the entire reactor module from a reactor bay and then lower the reactor module into containment vessel stand 660.

After being placed in containment vessel stand 660, a containment flange associated with the lower containment head may be de-tensioned by a containment tool, such as by loosening and/or removing a number of bolts. With the lower containment head decoupled from the containment vessel, the reactor module may be lifted from containment vessel stand 660 by the crane and placed in reactor pressure vessel stand 670. With the lower containment head remaining behind in containment vessel stand 660, a lower vessel head associated with a reactor pressure vessel may be placed in reactor pressure vessel stand 670.

After being placed in reactor pressure vessel stand 670, a reactor vessel flange associated with the lower vessel head may be de-tensioned by a reactor pressure vessel tool, such as by loosening and/or removing a number of bolts. One or both of the reactor pressure vessel tool and the containment tool may be operated remotely. With the lower vessel head decoupled from the reactor pressure vessel, the reactor module may be lifted from reactor pressure vessel stand 670 by the crane and moved to a maintenance facility. Additionally, the lower vessel head may be moved separately from the reactor module, or lower vessel head may be refueled and/or maintenance work performed while being held in reactor pressure vessel stand 670.

By including a plurality of reactor modules, reactor module 610 may be taken off-line for purposes of refueling, and/or maintenance while the remaining reactor modules continue to operate and produce power. In a nuclear power facility comprising twelve reactor modules, where each reactor module has a designed fuel life of two years, a different reactor module may be refueled every two months as part of a continuous refueling cycle. For reactor modules having longer designed fuel lives, the reactor modules may be refueled less frequently.

A fuel transport apparatus 640 may be configured to transport one or more fuel assemblies between refueling bay 665 and fuel storage facility 680. In some examples, fuel transport apparatus 640 may comprise an automated fuel loading system for removing, replacing, or adding fuel to a reactor core.

In some examples, fuel transport apparatus 640 may comprise a lower vessel inspection tree (LVIT) which may be configured to enter nuclear power building 600 through an opening or door for purposes of conducting visual and/or ultrasonic inspections of the reactor modules. In some examples, the fuel transport apparatus 640 and/or LVIT may be moved within nuclear power building 600 by crane 655.

Each of the reactor modules included in the nuclear power building 600 may comprise a relatively small reactor core, which in some examples may comprise 37 fuel assemblies. Hence, a twelve-module power plant with similarly configured reactor cores may be understood to contain a total of 444 fuel assemblies in the twelve operating cores. Discharged and/or partially spent fuel assemblies as well as new fuel assemblies may be stored in the shared spent fuel pool 680. In some examples, the multi-module power plant configuration may therefore allow for the potential to cross-load fuel assemblies discharged from one module into another module. By judicious inter-module shuffling of assemblies, fuel consumption can be maximized while maintaining reactivity limits in the individual operating cores.

Figure 7A:
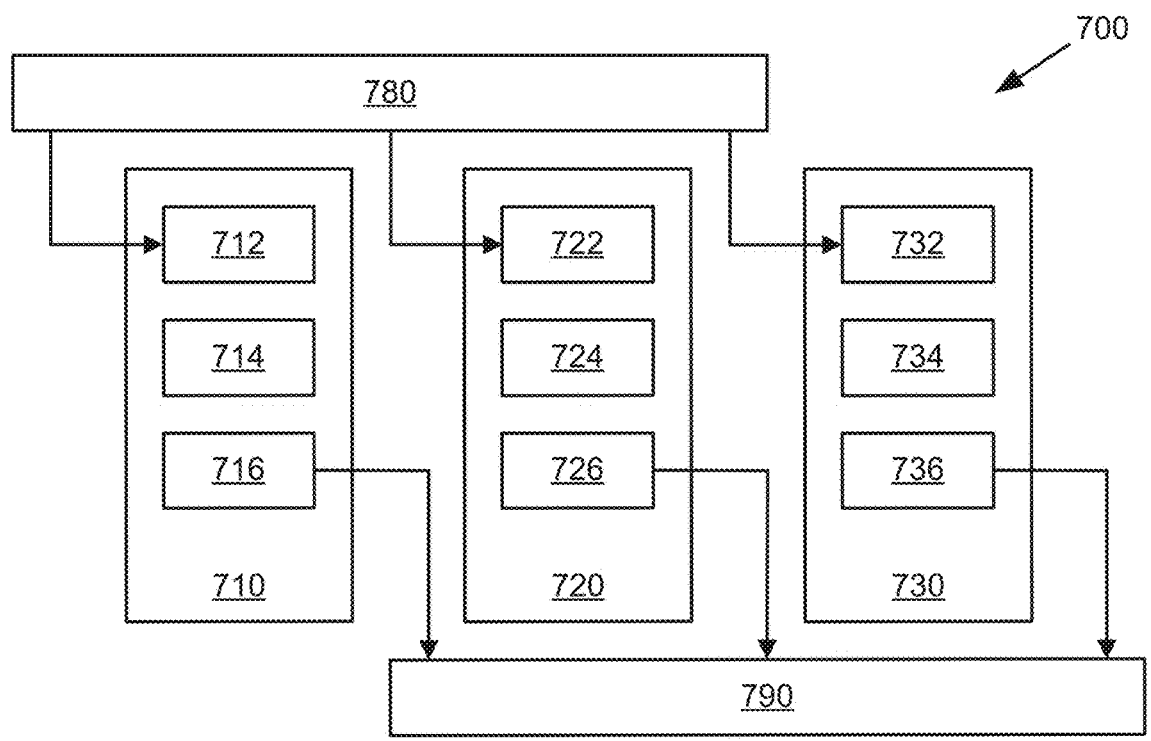
FIG. 7A illustrates an example fuel shuffling configuration associated with a number of fuel cycles.

FIG. 7A illustrates an example fuel configuration 700 or fuel shuffling process which may be associated with a number of fuel cycles. For a multi-modular power plant comprising three or more reactor modules and/or three or more reactor cores, an inter-module fuel shuffling process may be associated with a first reactor core 710, a second reactor core 720, and a third reactor core 730. In some examples, the fuel shuffling configuration 700 may be associated with three or more fuel cycles, in which three batches of fuel may be shuffled or otherwise moved between the reactor cores.

A first batch of fuel 712, 722, 732 may be associated with the first reactor core 710, the second reactor core 720, and the third reactor core 730, respectively. The first batch of fuel may comprise fresh or new fuel. In some examples, the first batch of fuel may be located in outer reactor core locations, such as first section 510 of FIG. 5A.

Similarly, a second batch of fuel 714, 724, 734 may be associated with the first reactor core 710, the second reactor core 720, and the third reactor core 730, respectively. The second batch of fuel may comprise fuel which has already been used or partially consumed during a previous fuel cycle. In some examples, the second batch of fuel may be located in intermediate reactor core locations, such as second section 520 of FIG. 5B.

Furthermore, a third batch of fuel 716, 726, 736 may be associated with the first reactor core 710, the second reactor core 720, and the third reactor core 730, respectively. The third batch of fuel may comprise fuel which has already been used or partially consumed during two previous fuel cycles. In some examples, the third batch of fuel may be located in central reactor core locations, such as third section 530 of FIG. 5C.

During a first fuel cycle, the three reactor cores 710, 720, 730 may be operated with the fuel configuration illustrated in FIG. 7A. For example, first reactor core 710 may be brought online or made critical with fuel 712, 714, 716. Similarly, second reactor core 720 may be brought online with fuel 722, 724, 726 and third reactor core 730 may be brought online with fuel 732, 734, 736.

At the conclusion of the first fuel cycle, some or all of the fuel may be shuffled between the reactor cores. Fuel 712, 714 may be moved from the first reactor core 710 to the second reactor core 720, and fuel 722, 724 may be moved from the second reactor core 720 to the third reactor core 730. In some examples, the fuel may be generally understood to move in a "forward" direction, from the first reactor core 710 to the second reactor core 720, and from the second reactor core 720 to the third reactor core 730. Additionally, the fuel may generally be understood to move from an outer section of the reactor cores to a central section of the reactor cores while the fuel is being shuffled between reactor cores, as further understood with reference to FIGS. 5A to 5C.

In a multi-modular power plant consisting of three reactor cores, fuel 732, 734 may be moved from the third reactor core 730 to the first reactor core 710, in a manner similar to that described directly above. In some examples, the fuel may be shuffled in a closed loop or circular pattern in which the fuel is moved between the three reactor cores at the conclusion of each subsequent fuel cycle.

In multi-modular plants comprising more than three reactor cores, fuel 732, 734 may be moved from the third reactor core 730 to a fourth reactor core (not shown). The fourth reactor core may be associated with a second set of three reactor cores which may be configured similarly as reactor cores 710, 720, 730. In some examples, the power plant may be configured with a number of reactor cores which equal a multiple of the number of fuel cycles.

In the example of a three fuel cycle shuffling process, the power plant may comprise three reactor cores, six reactor cores, nine reactor cores, twelve reactor cores, etc. Each set of three reactor cores may be configured similarly as reactor cores 710, 720, 730 and, in some examples, fuel shuffling may be accomplished between each set of reactor cores, forming a larger closed loop or circular pattern of fuel shuffling as subsequent reactor cores are brought online.

In an example four-cycle fuel shuffling process, the power plant may be configured with multiple sets of four reactor cores, such that the power plant may comprise four reactor cores, eight reactor cores, twelve reactor cores, etc. Still further, the number of batches of fuel associated with each reactor core may be equal to the number of fuel cycles. In the example three-cycle fuel shuffling process, each reactor core may be associated with three batches of fuel arranged in three discrete locations within the reactor core. Whereas in an example four-cycle fuel shuffling process, each reactor core may be associated with four batches of fuel arranged in four discrete locations within the reactor core.

At the conclusion of the fuel cycle associated with the fuel configuration illustrated in FIG. 7A, the fuel 716, 726, 736 may be understood as having been used for three fuel cycles and, in some examples, may further be understood as having reached the end of their useful lives. Accordingly, the fuel 716, 726, 736 may be removed from the reactor cores 710, 720, 730 and processed, reprocessed, or stored in a fuel storage facility 790, or otherwise disposed of. In some examples, fuel storage facility 790 may be understood to comprise a shared spent fuel pool. Similarly, at the conclusion of the fuel cycle, new or fresh fuel from fuel source 780 may be added to the reactor cores 710, 720, 730 to replace the fuel which has been removed.

The new fuel 780 may be placed in the reactor cores 710, 720, 730 in a similar manner as described with respect to the fuel array 500 illustrated in FIGS. 5A-C. For example, the new fuel may be placed in the outer periphery of the reactor cores, whereas the fuel 716, 726, 736 may be removed from the center or inner sections of the respective reactor cores. The fuel may be shuffled between the reactor cores 710, 720, 730 to optimally perturb or reconfigure the power distribution. The fully cyclic pattern may be repeated every third core reload of third fuel cycle.

Figure 7B:
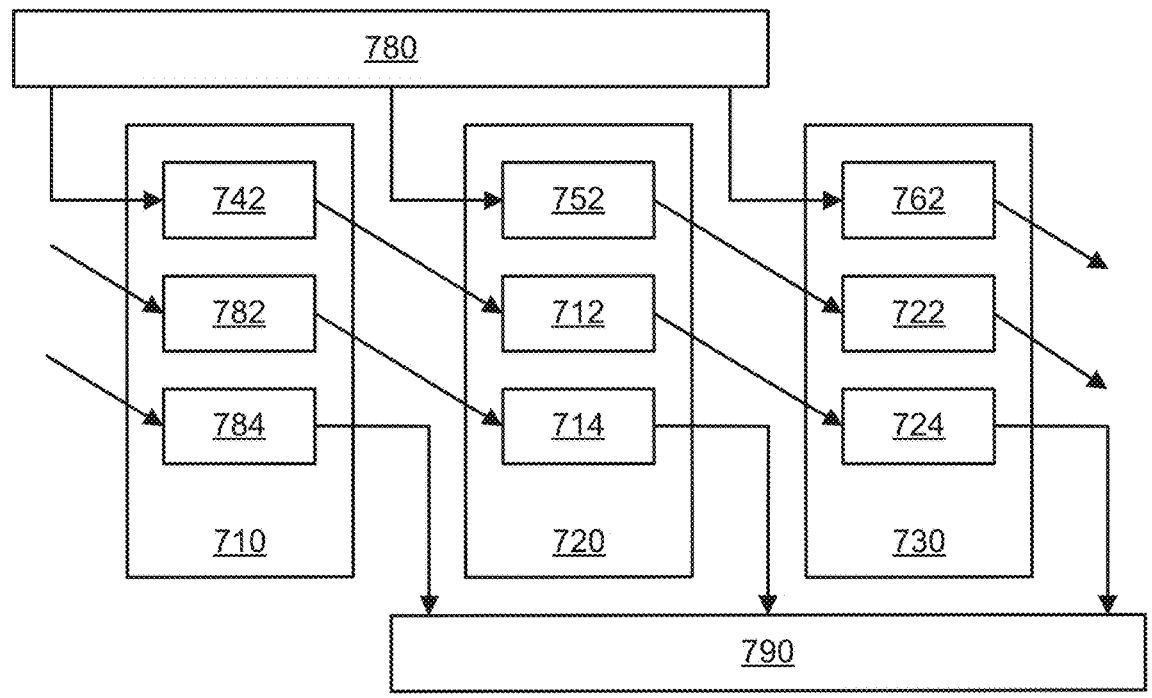
FIG. 7B illustrates a further example fuel shuffling configuration associated with a subsequent fuel cycle.

FIG. 7B illustrates a further example fuel shuffling configuration associated with a subsequent or second fuel cycle, in which new fuel 742, 752, 762 has been added to the reactor cores 710, 720, and 730, respectively, and the partially used fuel has been shuffled as previously described with reference to one or more examples described with respect to FIG. 7A.

In addition to new fuel 742, the first reactor core 710 is illustrated as comprising fuel 782 which was previously used for one fuel cycle, and fuel 784 which has been used for two previous fuel cycles. In addition to new fuel 752, the second reactor core 720 is illustrated as comprising fuel 712 which was previously used for one fuel cycle in the first reactor core 710, and fuel 714 which has been used for two previous fuel cycles. Similarly, the third reactor core 730 is illustrated as comprising partially spent fuel 722 and fuel 724 which was received from the second reactor core 720.

At the conclusion of the second fuel cycle, fuel 742 and fuel 782 may be moved from the first reactor core 710 to the second reactor core 720, and fuel 784 which has been used for three fuel cycles may be removed from the first reactor core 710 and stored in a fuel storage facility 790 or otherwise disposed of. Similarly, fuel 752 and fuel 712 may be moved from the second reactor core 720 to the third reactor core 730. Fuel 714, 724 which has been used for three fuel cycles may be stored in a fuel storage facility 790 or otherwise disposed of. In a third fuel cycle, new fuel 780 may be added to some or all of the reactor cores 710, 720, 730 in a similar manner as previously described.

Figure 7C:
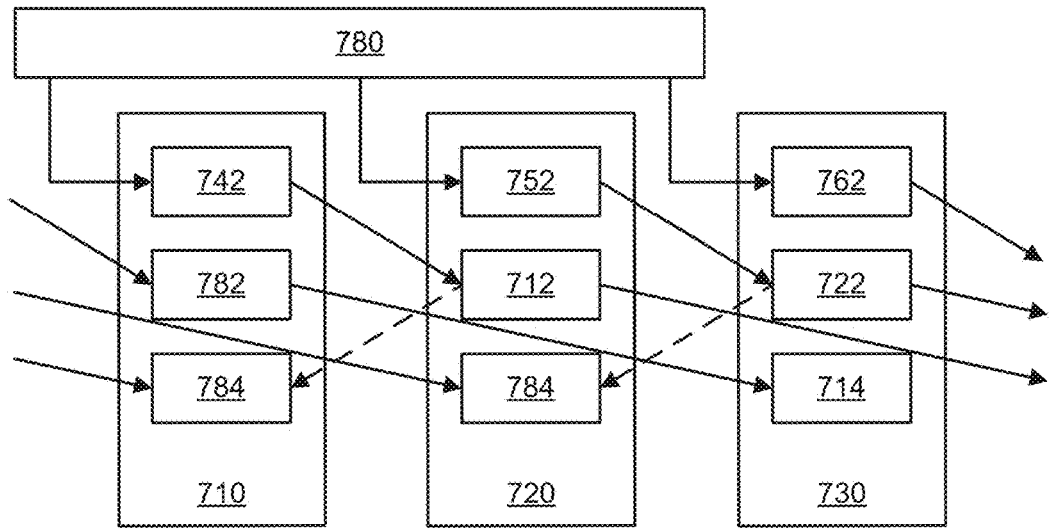
FIG. 7C illustrates yet another example fuel shuffling configuration associated with a further fuel cycle.

FIG. 7C illustrates yet another example fuel shuffling configuration associated with a subsequent fuel cycle. Whereas the fuel configuration illustrated in FIG. 7B may be accomplished by shuffling fuel in a forward direction to the next sequential reactor core, in other examples one or more batches of the fuel may skip the next reactor core. For example, with reference to the fuel configuration 700 illustrated in FIG. 7A, fuel 712 may be moved from the first reactor 710 to the second reactor 720, whereas fuel 714 may be moved from the first reactor 710 to the third reactor 730. Similarly, fuel 722 may be moved from the second reactor 720 to the third reactor 730.

For example power plants consisting of three reactor cores, or a single set of reactor cores, fuel 712 may subsequently be moved from the second reactor 720 to the first reactor 710, as shown in dashed line. Similarly, fuel 722 may alternatively be moved from the third reactor 730 to the second reactor 720. In some examples, the transfer of fuel from the second reactor 720 back to the first reactor 710 and/or from the third reactor core 730 back to the second reactor core 720, may be understood as being performed in a "reverse" direction.

Figure 8A:
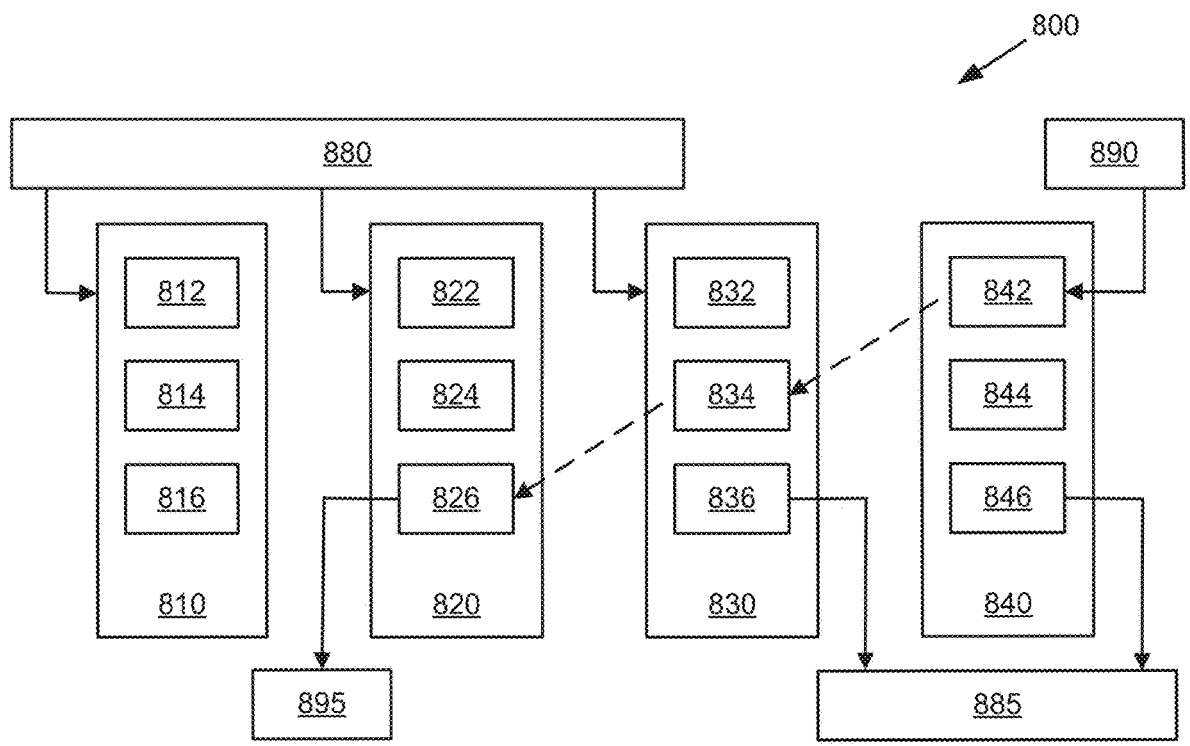
FIG. 8A illustrates an example fuel shuffling configuration in which fuel may be shuffled in both forward and reverse directions.

FIG. 8A illustrates a further example fuel configuration 800 or fuel shuffling process in which fuel may be shuffled in both "forward" and "reverse" directions. In the fuel configuration 800, a three-cycle fuel shuffling process may be augmented or supplemented with a fourth batch of fuel or, more generally an n+1 batch of fuel, where "n" denotes the number of standard fuel cycles associated with the useful life of the fuel.

For a multi-modular power plant comprising four or more reactor modules and/or four or more reactor cores, an inter-module fuel shuffling process may be associated with a first reactor core 810, a second reactor core 820, a third reactor core 830, and a fourth reactor core 840. More generally speaking, FIG. 8A may be understood as illustrating a set of reactor cores, where there are n+1 reactor cores for n fuel cycles. In examples in which fuel may be associated with a useful life of three fuel cycles, fourth reactor core 840 may comprise the n+1 reactor core. Additional sets of n+1 reactor cores may be configured similarly to provide additional fuel assemblies that may be shuffled and/or included in a larger inter-module fuel shuffling configuration.

A first batch of fuel 812, 822, 832 may be associated with the first reactor core 810, the second reactor core 820, and the third reactor core 830, respectively. The first batch of fuel may comprise fresh or new fuel. A second batch of fuel 814, 824, 844 may be associated with the first reactor core 810, the second reactor core 820, and the fourth reactor core 840, respectively. The second batch of fuel may comprise fuel which has already been used or partially consumed during a previous fuel cycle. Furthermore, a third batch of fuel 816, 836, 846 may be associated with the first reactor core 810, the third reactor core 830, and the fourth reactor core 840, respectively. The third batch of fuel may comprise fuel which has already been used or partially consumed during two previous fuel cycles.

At the conclusion of the fuel cycle associated with the fuel configuration illustrated in FIG. 8A, new or fresh fuel from fuel source 880 may be added to the reactor cores 810, 820, 830 to replace the fuel which has been removed. Additionally, a fourth batch of fuel 842 associated with the fourth reactor core 840 may similarly be replaced with new or fresh fuel 890 which may be added to the reactor core 840 to replace the fuel 842 which has been removed. In some examples, fuel 842 may be shuffled in the reverse direction from the fourth reactor core 840 to the third reactor core 830 as shown in dashed lines. Similarly, fuel 834 may be shuffled in the reverse direction from the third reactor core 830 to the second reactor core 820.

Fuel source 890 may comprise a different type of fuel than fuel source 880. In some examples, fuel source 880 may comprise uranium oxide fuel, and fuel source 890 may comprise mixed uranium-plutonium oxide (MOX) fuel. Fuel from fuel source 880 may be generally understood to be shuffled between some or all of the reactor cores in the forward direction, whereas fuel from fuel source 890 may be generally understood to be shuffled between some or all of the reactor cores in the reverse direction.

At the conclusion of the fuel cycle illustrated in FIG. 8A, fuel 816, 826, 836, 846 may be understood as having been used for three fuel cycles and, in some examples, may further be understood as having reached the end of their useful lives. Accordingly, fuel which originated from fuel source 880, such as fuel 816, 836, 846, may be removed from the reactor cores 810, 830, 840 and processed, reprocessed, or stored in a first fuel storage facility 885, or otherwise disposed of. Similarly, at the conclusion of the fuel cycle, fuel which originated from fuel source 890, such as fuel 826 may be removed from the second reactor core 820 and, in some examples, may be separately processed, reprocessed, or stored in a second fuel storage facility 895.

During a first fuel cycle, the four reactor cores 810, 820, 830, 840 may be operated with the fuel configuration illustrated in FIG. 8A. For example, first reactor core 810 may be brought online or made critical with fuel 812, 814, 816. Similarly, second reactor core 820 may be brought online with fuel 822, 824, 826, the third reactor core 830 may be brought online with fuel 832, 834, 836, and the fourth reactor core 840 may be brought online with fuel 842, 844, 846. At the conclusion of the first fuel cycle, some or all of the fuel may be shuffled between the reactor cores.

Figure 8B:
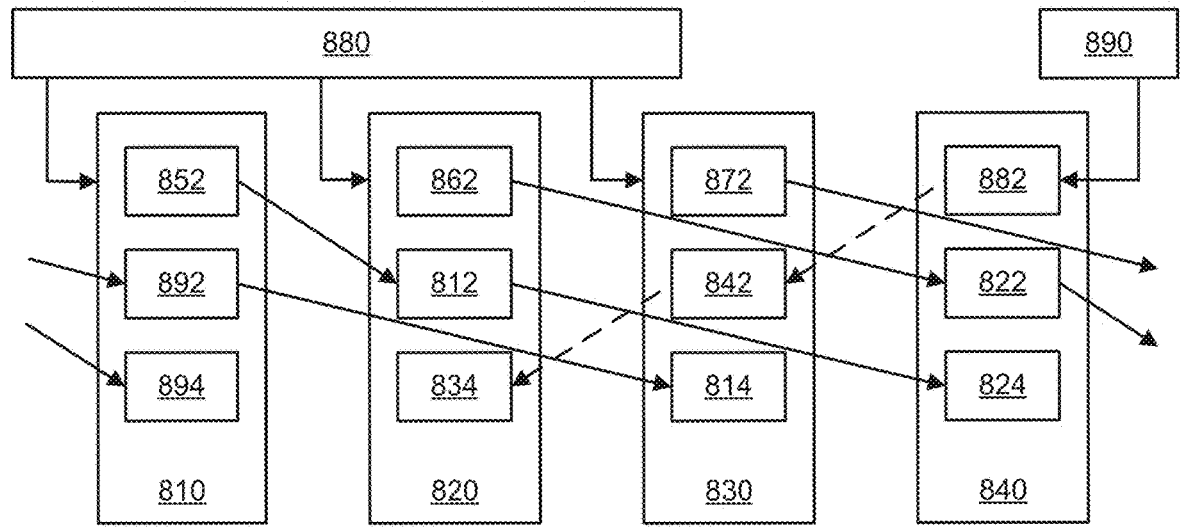
FIG. 8B illustrates a further example multi-directional fuel shuffling configuration associated with a subsequent fuel cycle.

FIG. 8B illustrates a further example multi-directional fuel shuffling configuration associated with a subsequent fuel cycle. Fuel 812 may be moved from the first reactor core 810 to the second reactor core 820. However, as fuel 834 is shown as having moved in the reverse direction from the third reactor core 830 to the second reactor core 820, fuel 814 may be moved from the first reactor core 810 to the third reactor core 830, essentially skipping the second reactor core 820. Additionally, as fuel 842 is shown as having moved in the reverse direction from the fourth reactor core 840 to the third reactor core 830, each of the fuel 822 and fuel 824 may be moved from the second reactor core 820 to the fourth reactor core 840, thereby skipping the third reactor core 830.

At the conclusion of the subsequent, or second fuel cycle, fuel 872 may be moved from the third reactor core 830 to a fifth reactor core, and similarly, fuel 822 may be moved from the fourth reactor core 840 to the fifth reactor core. The fifth reactor core may be associated with a second set of four reactor cores similarly arranged as reactor core 810, 820, 830, 840. In some examples, there may be three or more sets of reactor cores, each set comprising four reactor cores.

On the other hand, in a multi-modular power plant consisting of four reactor cores, fuel 872 may be moved from the third reactor core 830 to the first reactor core 810 (core location shown as including fuel 892), and fuel 822 may moved from the fourth reactor core 840 to the first reactor core 810 (core location shown as including fuel 894). In some examples, the fuel may be shuffled in a closed loop or circular pattern in which the unspent fuel is moved between the four reactor cores at the conclusion of each subsequent fuel cycle.

As described above, example fuel loading configurations in which the main batches of fuel originating from fuel source 880 progress through the reactor cores in the forward direction may be supplemented by a n+1 batch of fuel originating in fuel source 890 which may be shuffled backwards through the reactor cores. New fuel which has the greatest excess reactivity may be combined with other batches of fuel with moderate to low excess reactivity. For example, as the excess reactivity in the 890 fuel decreases, the n+1 batch of fuel may be shuffled backward into one or more cores associated with fuel having moderate and high excess reactivity.

The characteristics of the n+1 batch of fuel may be selected to capture residual energy output in under-utilized fuel, to help achieve favorable core neutronics or power distribution characteristics, to burn MOX fuel as a portion of the overall fuel used in the power plant, or any combination thereof. In addition to yielding improvements in overall fuel consumption, the example inter-module shuffling processes may be optimized to reduce the number of fuel cycles required to dispose of an existing plutonium stockpile.

In a twelve-module or other type of multi-module and/or multi-core power plant, fuel assemblies can be shuffled, moved, or otherwise selected from the spent fuel pool and/or from the reactor modules based on a number of criteria or characteristics. By way of non-exhaustive example, the characteristics may include: 1) having more available excess reactivity in order to reduce the enrichment (cost) of the fresh fuel loading, 2) having exposure or excess reactivity characteristics which are compatible with other assemblies in a module for power peaking and fuel utilization optimization, and/or 3) assemblies that might otherwise be considered fully "spent" in a single-module reload scheme, can be combined with fresh fuel with enough excess reactivity that the fuel assemblies can be used in an additional cycle.

As discussed above, inter-module fuel shuffling can also be benefited in a mixed fuel source paradigm, such as dual-fuel utilization of both MOX and UO2. In addition to the benefits mentioned previously, inter-module fuel shuffling can more quickly and more fully deplete MOX fuel assemblies. For example, the MOX stockpile may be depleted in a more expedient fashion while also getting the greatest energy output.

In some examples, the first core where the MOX is loaded, such as the fourth reactor core 840, may result in a high initial depletion of the fuel for the batch with the greatest excess reactivity, so that it will burn most preferentially. The burnup of the MOX fuel assembly may be maximized by keeping the fuel in the reactor cores for three cycles.

Figure 8C:
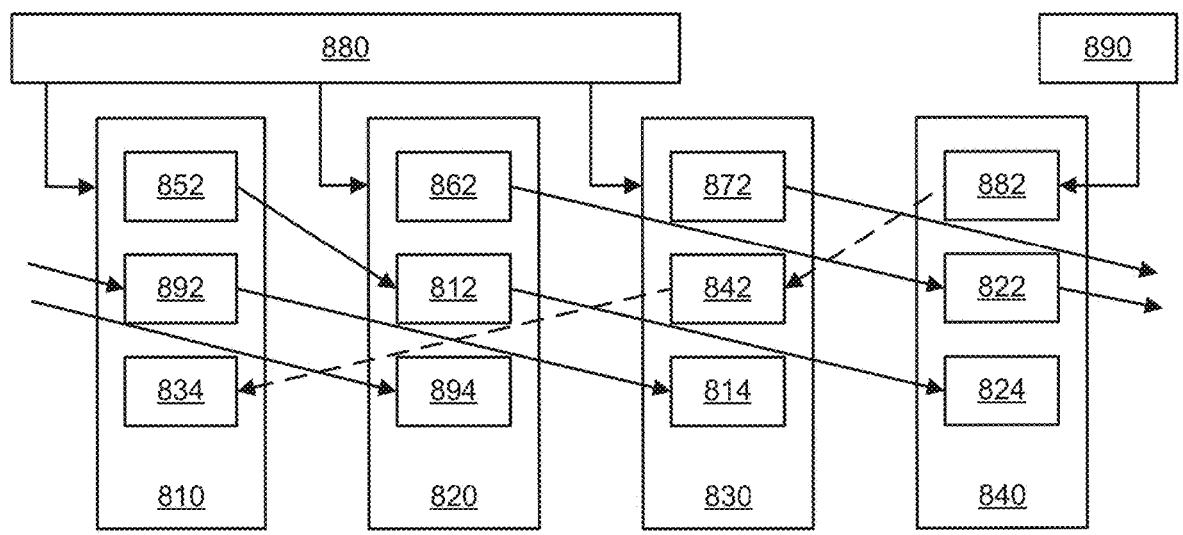
FIG. 8C illustrates yet a further example multi-directional fuel shuffling configuration associated with a subsequent fuel cycle.

FIG. 8C illustrates yet a further example multi-directional fuel shuffling configuration associated with a subsequent fuel cycle. The configuration illustrated in FIG. 8C differs from that shown in FIG. 8B as fuel 834 which was previously located in the third reactor core 830 (see FIG. 8A) has been shuffled backwards to the first reactor core 810 instead of to the second reactor core 820. Additionally, since the second reactor core 820 is no longer being fed fuel from the third reactor core 830 in the backwards direction, fuel 894 may be moved forward into the second reactor core 820, instead of being moved into the first reactor core 810, as compared to FIG. 8B.

Additional Example Fuel Configurations

Example fuel loading systems, configurations, and/or method of fueling may additionally be understood from the following descriptions with reference to FIGS. 8A-8C. First reactor core 810 may comprise a first fuel loading configuration including a first fuel assembly 812 associated with a first batch of fuel, and a first partial spent fuel assembly 814 associated with a second batch of fuel.

Second reactor core 820 may comprise a second fuel loading configuration including a second fuel assembly 822 associated with the first batch of fuel, and a second partial spent fuel assembly 824 associated with the second batch of fuel. The second partial spent fuel assembly 824 may have been removed from the first reactor core 820 and transported to a fuel storage facility following a prior fuel cycle. Additionally, the second reactor core 820 may comprise a third-cycle fuel assembly 826 including partially spent nuclear fuel that has previously completed two fuel cycles.

Third reactor core 830 may comprise a third fuel loading configuration including a third fuel assembly 832 associated with the first batch of fuel, and a third partial spent fuel assembly 834 that replaced the third-cycle fuel assembly 826 that was moved from the third reactor core 830 to the second reactor core 820. In some examples, the third-cycle fuel assembly 826 may have been removed from the third reactor core 830 following a prior fuel cycle and transported to the second fuel storage facility 895 before being inserted into the second reactor core 820.

Fourth reactor core 840 may comprise a fourth fuel loading configuration including a fourth fuel assembly 842 selected from a fourth batch of fuel. The fourth batch of fuel may comprise fresh fuel obtained from fuel source 890, in some examples, the fourth fuel assembly 842 may have replaced the third partial spent fuel assembly 834, that was moved from the fourth reactor core 840 to the third reactor core 830, following a prior fuel cycle.

One or more of the fuel loading configurations may be rearranged during a subsequent fuel cycle. For example, the second fuel configuration associated with the second reactor core 820 may be updated to include the fourth fuel assembly 842 for a subsequent fuel cycle as illustrated by the dashed line in FIG. 8B. Similarly, the fourth fuel configuration associated with the fourth reactor core 840 may be updated to include the second partially spent fuel assembly 812 for a subsequent fuel cycle.

Whereas the example configurations and processes have illustrated various configurations of forward and backward shuffling, including fuel shuffling techniques which may "skip" adjacent reactor cores in one or more instances in either direction, other example fuel shuffling techniques and patterns are contemplated herein. For example, different fuel batches may follow different patterns or alternate between fuel loading patterns, such as a combination of the configurations illustrated in FIGS. 8A and 8B. Similarly, different numbers and combinations of batches, reactor cores, fuel types, and/or fuel cycles may be employed to further vary the fuel shuffling combinations.

Still further, whereas several of the illustrated examples generally show the fuel being shuffled between reactor cores, in some examples a combination of inter-module and intra-module fuel shuffling may be performed. For example, fuel from a first section of one reactor core may be moved into a second section of the same reactor core, whereas fuel from a second section of the reactor core may be shuffled to another reactor core.

In an isolated or single reactor core of a conventional power plant, by contrast to the above example multi-modular reactor plants with inter-module fuel shuffling, the core designer may be limited by the number of assemblies that can be loaded into the core and by the number of locations that existing assemblies can be shuffled into. The small number of assemblies restricts the ability to effectively distribute assemblies of varied exposure or excess reactivity without challenging power peaking limits, among other challenges to reactivity limits.

By providing an inter-module shuffling process as described by the various example configurations and processes described herein, the number and possible arrangements of fuel locations and shuffling may be greatly increased.

Reactor Startup Fuel Configurations

The fuel configuration 800 illustrated by FIG. 8A may also be optimized for an initial reactor startup operation, such as the first time that a reactor plant comes online. New fuel 812, 822, 832, and 842 may be obtained from fuel sources 880 and 890, respectively. However, since the reactor start up may be the first time that some or all of the reactor cores 810, 820, 830, 840 have come online, the additional batches of fuel (e.g., second and/or third batches) may also not have been previously utilized in any of the reactor cores 810, 820, 830, 840. In other examples, less than all of the reactor cores 810, 820, 830, 840 may initially have been operational, and the remaining reactor cores may be added or brought online at a later date to provide supplemental power as energy demands increase over time.

To facilitate initiating of the reactor cores and achieve similar reactivity and power profiles as if all of the reactor cores of the power plant had been operational over multiple fuel cycles, some of the fuel assemblies in the second and third batches may comprise a reduced activity level or reduced fuel content in order to model partially spent fuel. For example, some of the fuel assemblies may be manufactured as startup fuel assemblies comprising varying amounts of uranium or varied levels of enrichment to replicate partially spent fuel.

By introducing the startup fuel assemblies into a reactor core which may be initiated for the first time, the fuel configuration may behave similar to fuel configurations which include partially spent fuel which have been shuffled for two or more fuel cycles. Accordingly, the reactor core(s) may be brought on line during the first startup in a similar manner as later plant startups which may occur following refueling operations after the power plant has been in operation for a number of fuel cycles.

In some examples, one or more of the fuel cycles may be staggered such as by performing a startup differential between the reactor cores to create the multiple fuel batch sequences. In other examples, the fuel for half of the reactor cores may be inter-module shuffled after a fuel cycle, and the fuel in the other half of the reactor cores may be intra-module shuffled after the same fuel cycle. Further, partially spent fuel may be temporarily stored in a fuel storage facility during a subsequent fuel cycle so that the fuel may skip fuel cycles and later be reintroduced into the fuel shuffling procedure in order to provide fuel batches with varying numbers of fuel cycle usage.

In still other examples, different numbers of fuel cycles may be associated with different reactor cores. For example, fuel for a first set of reactor cores may be associated with three fuel cycles and fuel for a second set of reactor cores may be associated with four fuel cycles. The length of each fuel cycle may vary between the sets of reactor cores such that the total usable life of the fuel is the same.

Additionally, a varying amount of reactivity that may otherwise be experienced during startup and/or during operation of a new power plant, may be controlled by adjusting a position of one or more control rods within the reactor core(s) and/or by changing the chemical makeup of the primary coolant, such as by adding boron, in order to vary the amount of fission events or criticality of the reactor core(s).

After a period of months or years from reactor startup, the fuel batches in all of the reactor cores may be shuffled between all the online reactor cores in a similar manner as one or more of the inter-module fuel shuffling techniques described herein.

Figure 9:
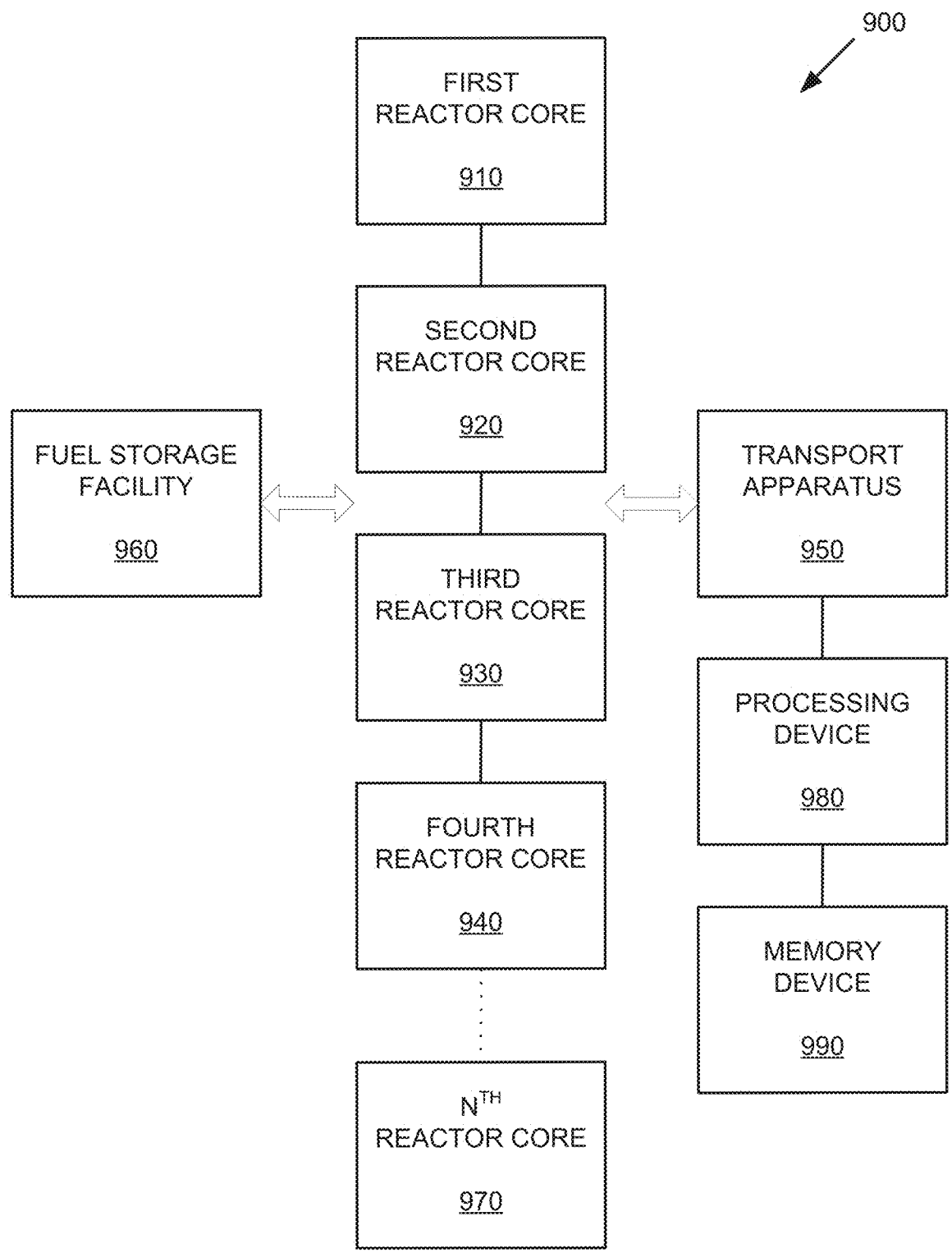
FIG. 9 illustrates an example system associated with loading fuel in multiple reactor cores.

FIG. 9 illustrates an example system 900 associated with loading fuel in multiple reactor cores. The system 900 may comprise a plurality of reactor cores, including a first reactor core 910, a second reactor core 920, a third reactor core 930, a fourth reactor core 940, and one or more additional reactor cores 970. In some examples, some or all of the reactors cores 910, 920, 930, 940 may be associated with a first set of reactor cores, and the additional reactor cores 970 may be associated with two or more additional sets of reactor cores. The additional sets of reactor cores may be configured similarly as the first set of reactor cores.

A fuel storage facility 960 may be configured to store a number of fuel assemblies associated with a plurality of on-site reactor cores. The fuel storage facility may comprise a shared spent fuel storage pool fluidly coupled to a plurality of reactor bays housing the plurality of on-site reactor cores.

A transport apparatus 950 may be configured to transport spent fuel assemblies to the fuel storage facility 960. In some examples, the transport apparatus 950 may comprise a crane configured to transport one or more of the reactor cores from the plurality of reactor bays to a refueling station located proximate to the fuel storage facility 960. Additionally, the transport apparatus 950 may comprise an automated, semi-automated, and/or remote fuel handling apparatus configured to add, remove, replace and/or otherwise handle new and spent fuel.

Transport apparatus 950 may be configured to transport partial spent fuel assemblies to the fuel storage facility 960 and/or replace one or more partially spent fuel assemblies of a reactor core located in a refueling station, with one or more other partially spent fuel assemblies located in the fuel storage facility 960 that have previously been removed from other on-site reactor cores.

A memory device 990 may have instructions stored thereon that, in response to execution by a processing device 980, cause the processing device 980 and/or the transport apparatus 950 to perform one or more operations. For example, the operations may comprise determining, for a first fuel cycle, a first fuel configuration associated with first reactor core 910. The first fuel configuration may comprise a first fuel assembly selected from a first batch of fuel and a first partially spent fuel assembly selected from a second batch of fuel.

The operations may further comprise determining, for the first fuel cycle, a second fuel configuration associated with the second reactor core 920, The second fuel configuration may comprise a second fuel assembly selected from the first batch of fuel, and a second partially spent fuel assembly selected from the second batch of fuel.

Additionally, the operations may comprise updating, for a second fuel cycle to be implemented after a completion of the first fuel cycle, the second fuel configuration associated with the second reactor core 920 to include a fresh fuel assembly and the first fuel assembly selected from the first batch of fuel.

In some examples, a third fuel configuration associated with the third reactor core 930 may also be determined for the first fuel cycle. The third fuel configuration may comprise a third fuel assembly selected from the first batch of fuel and a third partially spent fuel assembly. The second fuel configuration may be updated for the second fuel cycle by updating the second fuel configuration to include the third partially spent fuel assembly.

Still further, the operations may comprise determining, for the first fuel cycle, a fourth fuel configuration associated with the fourth reactor core 940, including a fourth fuel assembly selected from a fourth batch of fuel. In some examples, the third fuel configuration associated with the third reactor core may be updated for the second fuel cycle to include the fourth fuel assembly.

During a third fuel cycle, the operations may comprise updating the second fuel configuration associated with the second reactor core 920 to include the fourth fuel assembly, and updating the fourth fuel configuration associated with the fourth reactor core 940 to include the second partially spent fuel assembly.

Figure 10:
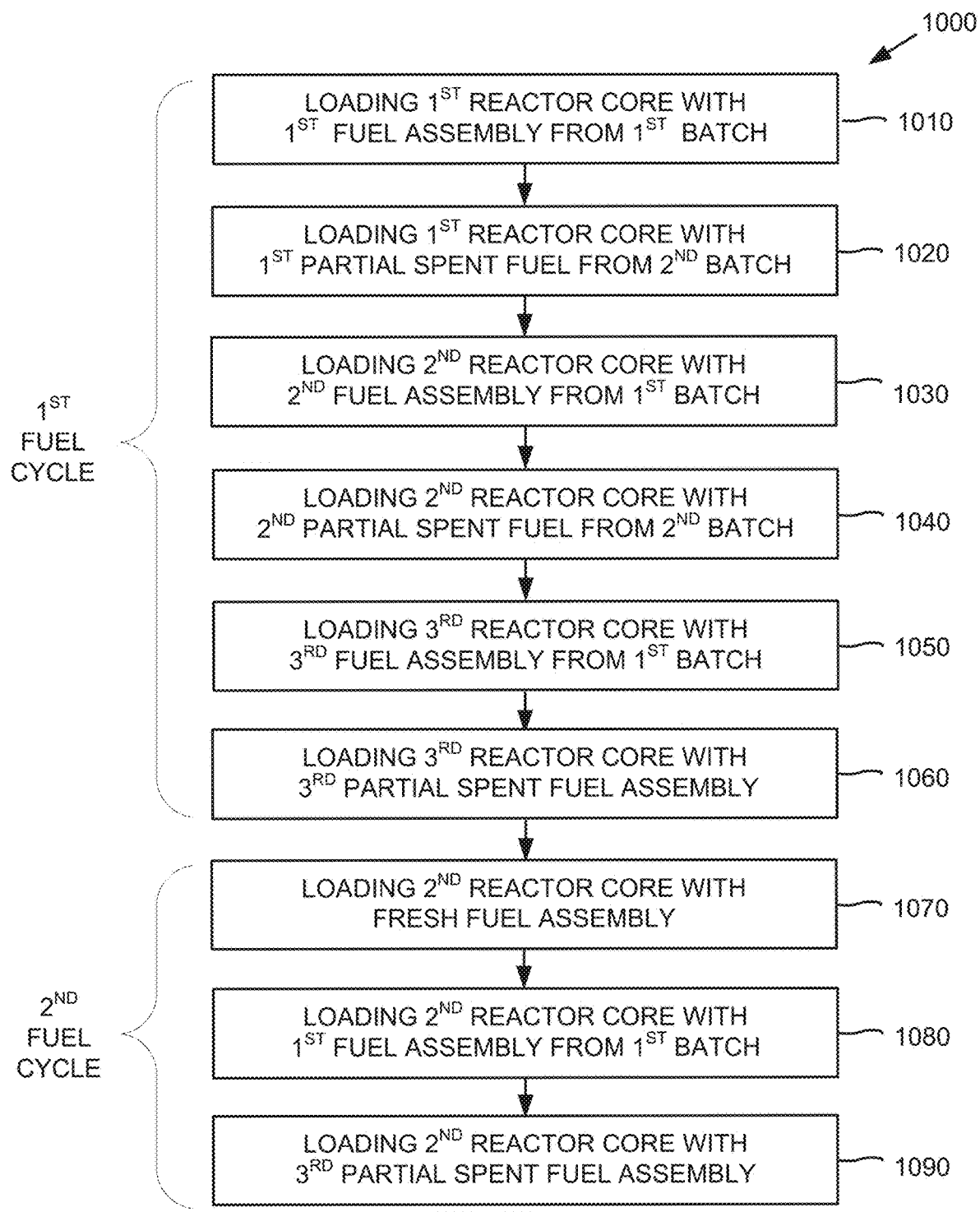
FIG. 10 illustrates an example fuel shuffling process for multiple reactor cores associated with a plurality of fuel cycles.

FIG. 10 illustrates an example fuel shuffling process 1000 for multiple reactor cores associated with a plurality of fuel cycles. In some examples, one or more of the example operations 1010 to 1060 may be understood as being associated with a first fuel cycle. Additionally, one or more of the example operations 1070 to 1090 may be understood as being associated with a second fuel cycle. Other example operations described herein may additionally be associated with a third fuel cycle, additional fuel cycles, or any combination thereof.

In a first fuel cycle, at operation 1010, a first reactor core may be loaded with a first fuel assembly selected from a first batch of fuel. Additionally, at operation 1020, the first reactor core may be loaded with a first partially spent fuel assembly from a second batch of fuel. At operation 1030, a second reactor core may be loaded with a second fuel assembly from the first batch of fuel, and at operation 1040, the second reactor core may be loaded with a second partially spent fuel assembly from the second batch of fuel.

In some example operations associated with the first fuel cycle, such as operation 1050, a third reactor core may be loaded with a third fuel assembly selected from the first batch of fuel. Additionally, at operation 1060, the third reactor core may be loaded with a third partially spent fuel assembly. In some examples, the third fuel assembly may comprise nuclear fuel including at least one isotope of uranium, and the third partially spent fuel assembly may comprise nuclear fuel including at least one isotope of plutonium.

In a second fuel cycle, performed after a completion of the first fuel cycle, operation 1070 may comprise loading the second reactor core with a fresh fuel assembly. At operation 1080, the second reactor core may additionally be loaded with the first fuel assembly from the first batch of fuel. In some examples, the second reactor core may be loaded with the first fuel assembly by removing the first fuel assembly from the first reactor core, and replacing the second partially spent fuel assembly with the first fuel assembly.

In some example operations associated with the second fuel cycle, such as operation 1090, the second reactor core may be loaded with the third partially spent fuel assembly. In example operations in which the first partially spent fuel assembly may be removed from the first reactor core after a conclusion of the first fuel cycle, the third reactor core may be loaded with the first partially spent fuel assembly in the second fuel cycle.

In examples comprising four or more reactor cores, a fourth reactor core may be loaded in the first fuel cycle with a fourth fuel assembly selected from a fourth batch of fuel. The third reactor core may be loaded with the fourth fuel assembly in the second fuel cycle. In some examples, the first batch of fuel may comprise fuel associated with a first nuclear isotope, and the fourth batch of fuel may comprise fuel associated with a second nuclear isotope that is different than the first nuclear isotope. By way of further non-exhaustive example, the first batch of fuel may comprise uranium-oxide (UO2) fuel, and the fourth batch of fuel may comprise mixed uranium-plutonium oxide (MOX) fuel.

The third reactor core may be loaded with the fourth fuel assembly by removing the third partially spent fuel assembly from the third reactor core and replacing the third partially spent fuel assembly with the fourth fuel assembly.

In example fuel cycles which include removing the second partially spent fuel assembly from the second reactor core and removing the fourth fuel assembly from the third reactor core, operations associated with a subsequent or third fuel cycle may comprise loading the second reactor core with the fourth fuel assembly, and loading the fourth reactor core with the second partially spent fuel assembly.

One or more example systems described herein may comprise various nuclear reactor technologies, and may comprise and/or be used in conjunction with nuclear reactors that employ uranium oxides, uranium hydrides, uranium nitrides, uranium carbides, mixed oxides, uranium silicides, thorium based fuels such as thorium-plutonium or uranium-thorium, zirconium-uranium metallic fuels, advanced accident tolerant fuels and/or other types of fuel. Although the examples provided herein have primarily described a pressurized water reactor and/or a light water reactor, the examples may be applied to other types of power systems. For example, the examples or variations thereof may also be made operable with a boiling water reactor, sodium liquid metal reactor, gas cooled reactor, pebble-bed reactor, and/or other types of reactor designs.

Additionally, the examples illustrated herein are not necessarily limited to any particular type of reactor cooling mechanism, nor to any particular type of fuel employed to produce heat within or associated with a nuclear reaction. Any rates and values described herein are provided by way of example only. Other rates and values may be determined through experimentation such as by construction of full scale or scaled models of a nuclear reactor system.

Having described and illustrated various examples herein, it should be apparent that other examples may be modified in arrangement and detail. We claim all modifications and variations coming within the spirit and scope of the following claims.

The invention claimed is:

1. A method of operating a power plant having plural reactor cores, the method comprising:
   in a first fuel cycle:
      providing a fuel configuration for a first reactor core of the plural reactor cores, the providing the fuel configuration for the first reactor core including:
         loading the first reactor core with a first fuel assembly selected from a first batch of fuel;
         loading the first reactor core with a first partially spent fuel assembly from a second batch of fuel; and
      providing a fuel configuration for a second reactor core of the plural reactor cores, the providing the fuel configuration for the second reactor core including:
         loading the second reactor core with a second fuel assembly from the first batch of fuel; and
         loading the second reactor core with a second partially spent fuel assembly from the second batch of fuel; and
      operating the first and second reactor cores with the fuel configurations, respectively; and
   in a second fuel cycle, performed after a completion of the first fuel cycle:
      providing a new fuel configuration for the second reactor core, the providing the new fuel configuration for the second reactor core including:
         loading the second reactor core with a fresh fuel assembly; and
         loading the second reactor core with the first fuel assembly from the first batch of fuel; and
      operating the second reactor core with the new fuel configuration.

2. The method of claim 1, wherein loading the second reactor core with the first fuel assembly from the first batch of fuel comprises:
   removing the first fuel assembly from the first reactor core; and
   replacing the second partially spent fuel assembly with the first fuel assembly.

3. The method of claim 1, further comprising:
   in the first fuel cycle:
      providing a fuel configuration for a third reactor core of the plural reactor cores, the providing the fuel configuration for the third reactor core including:
         loading the third reactor core with a third fuel assembly selected from the first batch of fuel; and
         loading the third reactor core with a third partially spent fuel assembly; and
      operating the first, second, and third reactor cores with the fuel configurations, respectively;
   wherein the providing the new fuel configuration for the second reactor core further comprises loading the second reactor core with the third partially spent fuel assembly.

4. The method of claim 3, further comprising:
   in the first fuel cycle:
      providing a fuel configuration for a fourth reactor core of the plural reactor cores, the providing the fuel configuration for the fourth reactor core including:
         loading the fourth reactor core with a fourth fuel assembly selected from a third batch of fuel;
   in the second fuel cycle:
      providing a new fuel configuration for the third reactor core, the providing the new fuel configuration for the third reactor core including loading the third reactor the fourth fuel assembly; and
      operating the second and third reactor cores with the new fuel assemblies, respectively.

5. The method of claim 4, wherein the first batch of fuel comprises fuel associated with a first nuclear isotope, and wherein the third batch of fuel comprise fuel associated with a second nuclear isotope that is different than the first nuclear isotope.

6. The method of claim 5, wherein the first batch of fuel comprises uranium-oxide (UO2) fuel, and wherein the third batch of fuel comprises mixed uranium-plutonium oxide (MOX) fuel.

7. The method of claim 4, wherein loading the third reactor core with the fourth fuel assembly comprises:
    removing the third partially spent fuel assembly from the third reactor core; and
    replacing the third partially spent fuel assembly with the fourth fuel assembly.

8. The method of claim 4, further comprising:
    after a completion of the second fuel cycle
        removing the second partially spent fuel assembly from the second reactor core;
        removing the fourth fuel assembly from the third reactor core;
        loading the second reactor core with the fourth fuel assembly; and
        loading the fourth reactor core with the second partially spent fuel assembly.

9. The method of claim 3, wherein the third fuel assembly comprises nuclear fuel including at least one isotope of uranium, and wherein the third partially spent fuel assembly comprises nuclear fuel including at least one isotope of plutonium.

10. The method of claim 3, further comprising:
    removing the first partially spent fuel assembly from the first reactor core after the completion of the first fuel cycle; and
    loading the third reactor core with the first partially spent fuel assembly after the completion of the first fuel cycle.

* * * * *

UNITED STATES PATENT AND TRADEMARK OFFICE
CERTIFICATE OF CORRECTION

PATENT NO. : 10,818,403 B2  
APPLICATION NO. : 15/445186  
DATED : October 27, 2020  
INVENTOR(S) : Allyson Kitto et al.

Page 1 of 1

It is certified that error appears in the above-identified patent and that said Letters Patent is hereby corrected as shown below:

In the Specification

In Column 1, Line 48, delete "herein," and insert -- herein. --, therefor.

In Column 3, Line 62, delete "52," and insert -- 52. --, therefor.

In Column 4, Line 25, after "direct" insert -- (e.g., --.

In Column 4, Line 49, delete "Diming" and insert -- During --, therefor.

In Column 5, Line 35, delete "224," and insert -- 224. --, therefor.

In Column 7, Line 6, delete ""A1"" and insert -- "A0" --, therefor.

In Column 8, Line 22, delete "A1" and insert -- A0 --, therefor.

In Column 9, Line 26, delete "refueling," and insert -- refueling --, therefor.

In Column 15, Line 32, delete "890, in" and insert -- 890. In --, therefor.

In Column 17, Line 61, delete "920," and insert -- 920. --, therefor.

In the Claims

In Column 20, Line 55, in Claim 4, after "reactor" insert -- core with --.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*